(12) United States Patent
Zuccherato et al.

(10) Patent No.: US 6,988,198 B1
(45) Date of Patent: Jan. 17, 2006

(54) SYSTEM AND METHOD FOR INITIALIZING OPERATION FOR AN INFORMATION SECURITY OPERATION

(75) Inventors: Robert Zuccherato, Ottawa (CA); Adrian Mancini, Nepean (CA)

(73) Assignee: Entrust Limited, Ottawa (CA)

( * ) Notice: Subject to any disclaimer, the term of this patent is extended or adjusted under 35 U.S.C. 154(b) by 0 days.

(21) Appl. No.: 09/430,879

(22) Filed: Nov. 1, 1999

(51) Int. Cl.
   *H04L 9/32* (2006.01)

(52) U.S. Cl. .................................... 713/170; 713/202
(58) Field of Classification Search ................ 713/170, 713/171, 168, 155, 201, 202
   See application file for complete search history.

(56) References Cited

U.S. PATENT DOCUMENTS

| 4,771,461 A | * | 9/1988 | Matyas | 380/282 |
| 4,783,798 A | * | 11/1988 | Leibholz et al. | 713/155 |
| 6,038,319 A | | 3/2000 | Chari | |
| 6,226,383 B1 | | 5/2001 | Jablon | |
| 6,378,072 B1 | | 4/2002 | Collins et al. | |
| 6,609,198 B1 | * | 8/2003 | Wood et al. | 713/155 |

OTHER PUBLICATIONS

Co–pending Appl. No. 09/478,254, filed Jan. 6, 2000, Zuccherato et al.

Jablon, David P., "Strong Password–Only Authenticated Key Exchange," ACM Computer Communications Review, Oct. 1996.

* cited by examiner

*Primary Examiner*—Matthew Smithers
(74) *Attorney, Agent, or Firm*—Vedder, Price, Kaufman & Krummholz, P.C.

(57) ABSTRACT

A method and apparatus for initializing operation for information security operation for an entity utilizes shared information, such as shared secret information, that may be shared between the entity and other applications or operations within a system to initialize an entity. Prestored shared information that can be used as entity identification data (RV) and authentication data (IAK) that is associated with the entity identification data is encrypted and sent in clear text fashion to an initialization authentication unit, such as a server or other processing unit. The initialization authentication unit requests stored shared data from another processing unit that maintains a database. The other processing system then responds to the request by providing prestored shared data that can be used to, for example, decrypt the encrypted information sent in a clear text fashion to determine whether an entity is a proper user of the information security operation. Accordingly, no secure session is required, and no new generation of identification data or authentication data is required.

35 Claims, 2 Drawing Sheets

SYSTEM AND METHOD FOR INITIALIZING OPERATION FOR AN INFORMATION SECURITY OPERATION

FIELD OF THE INVENTION

The invention relates generally to systems and methods for registering entities to use an information security processor system, and more particularly to systems and methods for initializing operation of an information security operation for an entity, such as for registration for public key infrastructure information security systems.

BACKGROUND OF THE INVENTION

With the increased use of telecommunications systems, information security has become an important aspect of promoting communications over various communication links such as over the Internet, wireless links and other communication links. Ensuring that a particular entity, such as a user, software application, network node or other entity, is a proper entity that has proper authorization to use the information security system, has become an important consideration in designing information security systems. Present methods for registering entities for using information security operations, such as public key based information security systems, can involve distributing a reference value (RV) or other identifying information that may uniquely identify the entity, along with an initial authentication key (IAK) or some other authenticating information that is provided to the entity.

For example, when a user first signs onto a public key infrastructure system, out of band information such as the reference value (RV) and the initial authentication key(IAK) may be communicated through the mail, or other out of band mechanism to ensure that the information is not intercepted by an unscrupulous party. Initial authentication keys may be, for example, MAC keys used to authenticate a user that employs a specific reference value. The reference value may be, for example, a random number, employee identification number or any other suitable identifying information. However, with out of band communications of such information, costly initialization procedures result. For example, in a corporation that has 100,000 employees, the out of band communications can require enormous amounts of resources. In addition, personnel typically must be available around the clock if a new user wishes to be initialized on a system at any time of day.

Some conventional systems use in band communications to provide pre-existing secret information that is known, for example, to a registration server. For example, pre-existing secret information may be, for example, an employee identification number stored on a registration server of the corporation. Such initialization methods typically generate an initial authentication key and/or reference value based on the pre-existing information and sends this information back to the client over a secure link. This may require, for example, a secured session to obtain initial authentication keys and reference values for initialization. However, known systems typically then discard the information and require regeneration of new information security authentication information such as random numbers after initial authentication has been granted, to continue use and access to the information security system. Problems can arise with known systems since known systems typically have to return an initial authentication key to an entity by a secured link or through an out of band communication.

Other known conventional systems require new information such as initial authentication keys and other identifying information be created. However, most information communication systems already employ some type of identifying information, such as employee numbers or other information, that is confidential which could be used to authenticate a particular user for access to an information security process. However, the shared information is typically kept in a back end data base and an information security system such as a software application may not use any other pre-existing shared information since the information may relate to other software applications. One solution has been to produce custom software applications for each different environment or to include a list of questions to be asked locally at the remote terminal which can be read by an application. However, the creation of new applications requiring their separate initial authentication keys and new reference values can require a great deal of development costs. Some systems provide a list of questions to request suitable access information. The access information is generated by each application. Also, the distribution of a list of questions does not typically allow different questions for different users unless it is known ahead of time that a particular user will be using a particular terminal. As such, there are environments where distributing reference values and initial authentication keys is not feasible. For example, when attempting to register a large number of geographically distributed users, providing each of them with a reference value and initial authentication key can severely hamper deployment of the application.

Consequently, there exists a need for a system and method for initializing operation of an information security operation for an entity, that leverages pre-existing shared information, such as secret information, to assist in entity registration. In addition, such a system should be relatively automatic to allow secure automatic registration of an entity for use in security operation.

BRIEF DESCRIPTION OF THE DRAWINGS

The disclosed invention will be more readily understood in view of the below-listed drawings, wherein.

DETAILED DESCRIPTION OF THE PREFERRED EMBODIMENT

Generally, a method and apparatus for initializing operations, for an information security operation, for an entity utilizes shared information, such as shared secret information, that may be shared between the entity and other applications or operations within a system to initialize an entity. Pre-stored shared information that can be used as entity identification data (RV) and authentication data (IAK) that is associated with the entity identification data is encrypted and sent in clear text fashion to an initialization authentication unit, such as a server or other processing unit. The initialization authentication unit requests stored shared data from another processing unit that maintains a database. The other processing system then responds to the request by providing prestored shared data that can be used to, for example, decrypt the encrypted information sent in the original message a clear text fashion to determine whether an entity is a proper user of the information security operation. Accordingly, no secure session is required, and no new generation of identification data or authentication data is required.

Figure 1:
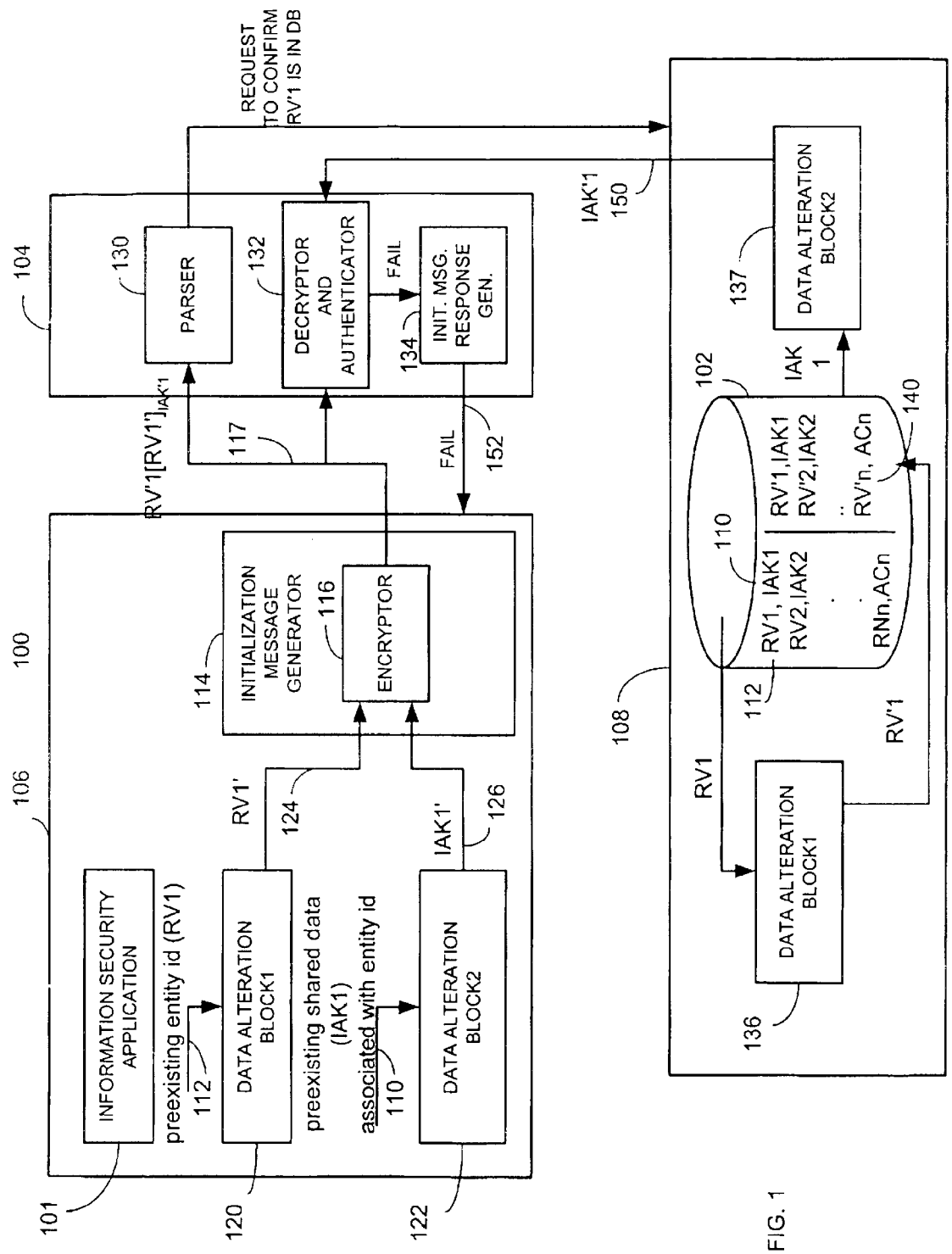
FIG. 1 is a block diagram illustrating one example of a system for initializing operation for an information security operation for an entity in accordance with one embodiment of the invention.

FIG. 1 illustrates a system 100 for initializing operation for an information security operation 101 for an entity, that includes memory 102, and initialization authentication unit 104 and a processing unit 106. The information security operation 101 may be, for example, symmetric key or public key based crypto operations including, for example, encryption, decryption, certificate usage, digital signatures, time stamping or any other function. The processing unit 106 may serve as the entity desiring access to an information security operation, and may also be, for example., a software application or any other suitable entity. For purposes of illustration, and not limitation, the processing unit 106 will be considered a node in a computer network and the initialization authentication unit 104 may be a server in the network while the memory 102 may be, for example, a back end data base maintained by another data base host such as a processing unit 108 that is operatively coupled to the initialization authentication unit 104. However, it will be recognized that the disclosed system and methods may be used in any suitable system employing information security operations, such as public key infrastructure systems, mobile telecommunication systems, and any other suitable information communication systems.

The memory 102 contains, for example, a data base having prestored entity identification data (RV) 112 such as a user's name that may have been entered due to use of another software application used or accessible by, for example, another node or the first processing unit 106 in the case where it is a computer node. The memory 102 also includes data representing shared data 110, such as shared secret information, that is associated with the entity identification data 112. The shared data 110, for example, the prestored shared information 1 10 may be values from, for example, a most recent pay stub, or tax return, pre-existing passwords, or any other suitable information that is uniquely associated with the entity identification data, such as a person's name. This prestored entity identification data and shared data is assumed to be known by the entity seeking initialization, or may be communicated out of band to the processing unit 106. In any event, the first processing unit 106 is coupled to receive the data representing the entity identification data 112 and the shared data 110 through, for example, a keyboard or other mechanism. The first processing unit 106 includes an initialization message generator 114 and an encryptor 116 that encrypts data based on the shared data 110. The initialization message generator 114 generates an initialization message 117 for the initialization authentication unit 104. The encryptor 116 may be any suitable encryption algorithm, a MAC, block cipher, digital signature algorithm or any other suitable encryption process. The initialization message generator 114 generates initialization message 117 that contains, in a clear text fashion, entity identification data 112 and encrypted data. In this example, the encrypted data includes encrypted entity identification data. The entity identification data is encrypted, for example, using the shared data 110 as an encryption key. In addition to the encrypted entity identification data, a non-encrypted version of the entity identification 112 is also communicated as part of the initialization message.

The initialization authentication unit 104 receives the communicated entity identification data and the encrypted data and compares the prestored shared data 110 (or a function thereof) to shared data derived from the encrypted data from the initialization message, to obtain the entity identification data. The initialization process uses the obtained entity identification data and the shared data as initialization registration data to register the entity as a proper user of the information security operation 101. The information security operation may be, for example, a public key based encryption and digital signature application or any other suitable information security application or operation. The registration of the entity is done in response to comparing prestored shared data obtained from the database to the shared data (or a function thereof) derived from the encrypted data in the initialization message 116. In addition to user names and other information, it will be recognized that shared secret data and/or the entity identification data may be temporal data, such as a date, date and time, or other suitable temporal data The use of temporal data helps to prevent replay of valid messages at a later time.

The first processing unit 106, in another embodiment, includes data alteration blocks 120 and 122. These data alteration blocks may be any suitable algorithms that perform a data alteration function, such as, for example, public key encryption (RSA), a hash function, a password authenticated key exchange-type transformation, identity function, a MAC or any other suitable data alteration function. If should be noted that this alteration function may require further interaction with the initialization authentication unit or with the processing unit 108. In this embodiment, the entity identification data 112 is passed through the data alteration block 120 which generates first data 124 which is a function of the entity identification data 112. Similarly, the data alteration block 122 receives the shared data 110 and performs the appropriate function on the data and outputs second data 126 that is a function of the shared data 110. The encryptor block 116 then generates as part of the initialization message, an initialization message to the initialization authentication unit that contains, for example, the first data 124 that is a function of the entity identification data, as well as an encrypted form 117 of the first data that is encrypted based on the second data 126. This message is represented as RV'[RV']IAK.

The initialization authentication unit 104, such as a suitably programmed certification authority or other server, includes a message parser 130, a decryptor and authenticator 132, and an initialization message response generator 134.

The processor 108 includes, in addition to the memory 102 containing a database, data alteration blocks 136 and 137. These data alteration blocks are identical to data alteration blocks 120 and 122, respectively. It should be noted that these data alteration blocks may require further interaction with the processing unit 106 or with the initialization authentication unit. As shown, the database may include, for example, database entries in the form of a table that include a generated copy of the first data 140 with the prestored shared secret data 110.

The data authorization blocks 120, 122, 136 and 137, may be, for example, software modules such as .dll files or any other suitable hardware or software that perform any desired alteration of the data.

Figure 2:
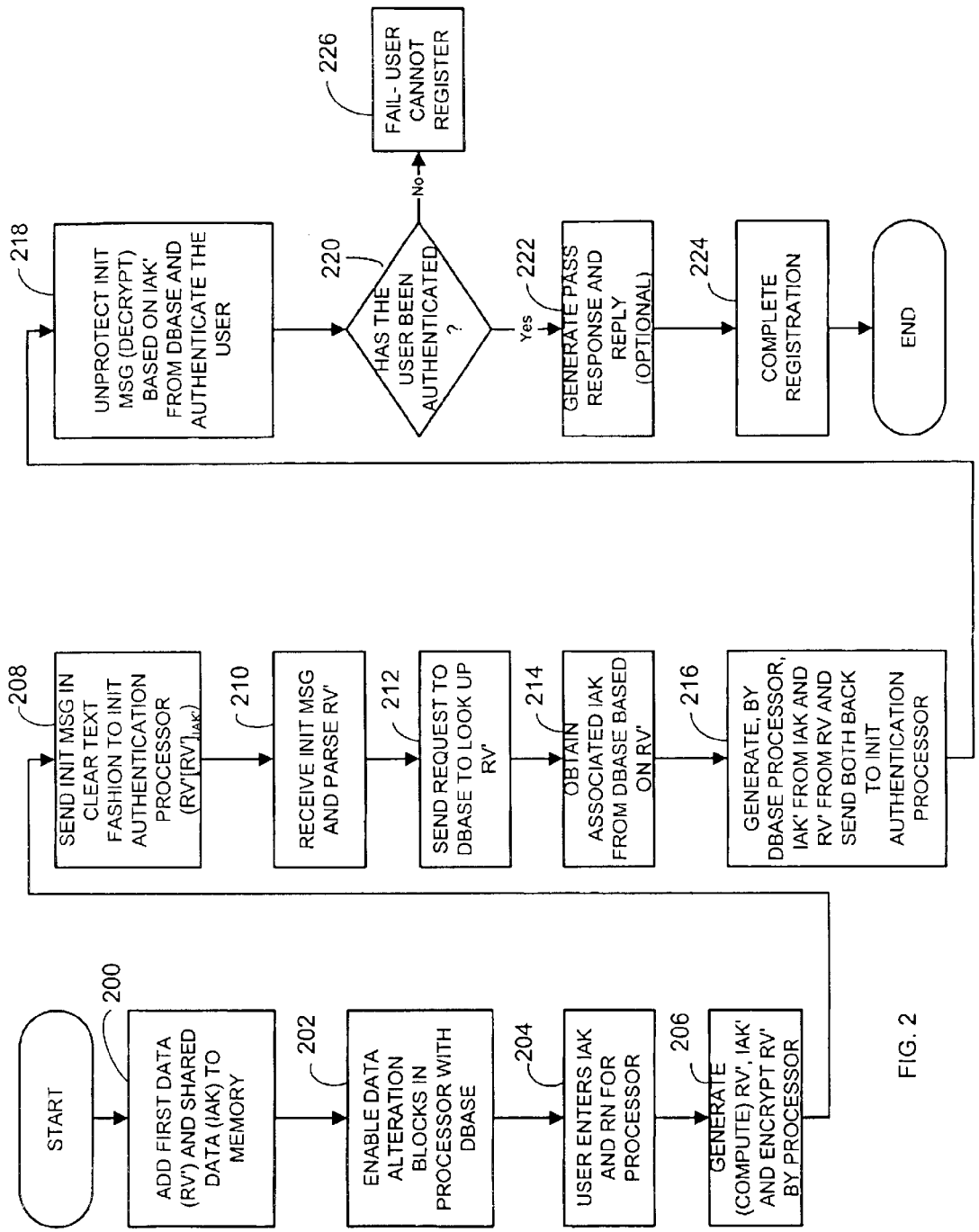
FIG. 2 is a flow chart illustrating one example of the operation of the system shown in FIG. 1.

Referring to FIG. 2, in operation, the system of FIG. 100 stores prestored data representing entity identification data 112 and shared data 110. In addition, the system preloads or generates a copy of the first data 140 along with the associated shared data 110 in the database. This is shown in block 200. As shown in block 202, the processor 108 enables the data alteration blocks 136 and 137. As shown in block 204, the user enters the entity identification data 112 and the shared data, 110, such as a shared secret password for use by the first processing unit 106. As shown in block 206, processing unit 106 generates the first data 124 and second data 126. As shown in block 208, the processing unit 106 sends the initialization message in a clear text fashion to the initialization authentication unit 104. This includes data to determine the integrity of the first data, based on the second data. As such, the process includes encrypting the first data, based on the second data. As shown in block 210, the initialization authentication unit 104 receives the initialization message and parses (e.g., extracts) the unencrypted first data portion of the initialization message. It then sends the extracted or parsed first data to the processor 108 so that the processor 108 can use the first data as an index to obtain, from the lookup table or database, the corresponding shared secret associated with the first data. This is shown in block 212. As shown in block 214, the processor 108 obtains the shared secret from the lookup table based on the first data. As shown in block 216, the processor 108 then generates a copy of the second data as a function of the extracted prestored shared secret data to generate a copy of the second data 150. In addition, the processor 108 may generate another copy of the first data 152 by passing the data 112 through data alteration block 136. This is done, for example, upon initialization to populate the database with data entries having entity identification data as modified by the alteration block, associated with unaltered shared secret data. As shown in block 218, the copy of the second data is then passed to the decryptor and authenticator 132 where the initialization message will be unprotected, which allows authentication of the user. The method of authentication and nature of unprotecting of the message will depend on the type of protection (encryption) used. As shown in block 220, if the user is authenticated the entity is granted access to the security operation and an optional response to the processor 106 indicating accepted registration is generated as shown in block 222. As shown in block 224, registration is completed by performing any other necessary processes. However, if the copy of the first data does not match the decrypted first data value, initialization will not be granted and a fail message 152 may be generated to inform the processor 106 of the failure. This is shown in block 226.

Stated another way, the method for initializing operation of the information security operation for an entity includes obtaining the prestored data representing the entity identification data 112, such as by the processor 106, and obtaining prestored data representing the shared secret data associated with the entity identification data, such as by the processor 106. The processor 106 then generates the first data 124 that is a function of the entity identification data 112. The process also includes generating second data 126 that is a function of the shared secret data 110, where the shared data is secret data, meaning it is shared by the processor 108 and processor 104 but is not generally known to other users. The process includes encrypting the first data 124 based on the second data 126 using a suitable encryption algorithm, such as a symmetric keybased algorithm, a MAC operation, digital signature or any other suitable operation as known in the art. The process includes communicating, by the initial message generator, in a clear text fashion, the entity identification data 124 along with the encrypted first data, for evaluation by the initialization authentication unit. The process also includes, such as during initialization, generating a copy of the first data 140 as a function of the prestored data representing the identification data, namely data 112. This may be done, for example, by the processor 108. The processor 108 also in any suitable manner such as using any suitable data base structure, may store the copy of the first data 140 with the prestored shared secret data 110 and database entries, table format, or any other suitable structure. The processor 108, extracts from a database entry, the prestored shared secret data 110 based on the communicated first data 124 from the initialization message.

The processor 108 also generates a copy of the second data 150 as a function of the extracted prestored shared secret data 110. The processor 108 communicates, for example, in a response message or makes available in some other fashion by providing the copy of the second data 150 for use in authenticating the user and to obtain the entity identification data 124. Using the obtained entity identification data, such as the first data, in the shared secret data as initialization registration data, the system registers the entity as a proper user of the information security operation.

Accordingly, the system, among other things, avoids the need for a secure session between the processor 106 and the initialization authentication unit 104. In addition, there is no need to return an initial authentication key to the processor 106. As such, conventional additional communications are eliminated.

In addition, it will be recognized that any functions described herein may be suitably performed by any of the units described, and it will also be recognized that the various functions may be performed by hardware, firmware, software, discrete logic, or any suitable combination thereof. For example, decryptor 132 can be changed to an encryptor (like encryptor 116) to encrypt data 134 (obtained from initialization image 117) with the second data 150, whereafter the encryptor compares the initialization message 117 to the encrypted second data to see if they are the same. In another embodiment, instead of the server 104 performing the encryption, the encryption of the first data 140 is performed by the processor 108. It will be recognized that where the data alteration blocks are unit functions, meaning that no alteration has occurred, the entity identification data and the first data may be identical. Similarly, the shared data 110 and the second data 126 may also be identical if a unitary function is used as the data alteration block.

In addition, the system as illustrated, for example in FIG. 1, may consist of a plurality of processing units, such as 106, 104, and 108 that may process executable instructions that are stored on one or more storage mediums or are downloadable from one or more storage mediums. Accordingly, storage medium such as CD ROM, hard drive, RAM, ROM or any other suitable storage medium may be suitably programmed to contain executable instructions that allow the various processors to perform the functions of the system as disclosed herein.

It should be understood that the implementation of other variations and modifications of the invention in its various aspects will be apparent to those of ordinary skill in the art, and that the invention is not limited by the specific embodiments described. It is therefore contemplated to cover by the present invention, any and all modifications, variations, or equivalents that fall within the spirit and scope of the basic underlying principles disclosed and claimed herein.

What is claimed is:

1. A method for initializing operation for an information security operation for an entity comprising the steps of:
   obtaining data representing entity identification data;
   obtaining data representing shared data associated with the entity identification data;
   encrypting data, based on the shared data;
   communicating in a clear text fashion, the entity identification data and the encrypted data for evaluation by an initialization authentication unit;

comparing prestored shared data to shared data derived from the encrypted data to obtain the entity identification data; and using the obtained entity identification data and the shared data as initialization registration data to register the entity as a proper user of the information security operation, in response to the step of comparing prestored shared data to shared data derived from the encrypted data.

2. The method of claim 1 wherein the data that is encrypted includes data representing the entity identification data.

3. The method of claim 1 wherein the data that is encrypted includes temporal data.

4. The method of claim 2 including the step of generating first data that is a function of the entity identification data, and wherein the step of encrypting data includes encrypting the first data based on the shared data.

5. The method of claim 4 including the step of generating second data that is a function of the shared data, and wherein the step of encrypting data includes encrypting the first data based on the second data.

6. The method of claim 5 wherein the first data and second data are generated using a function from the group consisting of: a one way hash function and PAKE.

7. The method of claim 1 including the step of: pre-storing the data representing the entity identification data and pre-storing the shared data, prior to the steps of obtaining.

8. The method of claim 7 including the steps of:
generating first data that is a function of the prestored data representing the entity identification data;
storing the first data with the prestored shared data as database entries;
extracting from a database entry, the prestored shared data based on the first data;
generating second data as a function of the extracted prestored shared data; and
providing the second data for use in the step of comparing.

9. The method of claim 1 wherein the shared data is shared secret data.

10. The method of claim 8 including the step of:
prior to the step of comparing, decrypting, by the initialization authentication unit, the encrypted data using the second data.

11. The method of claim 1 wherein steps of comparing prestored shared data to shared data derived from the encrypted data includes comparing data derived from the prestored shared data to data derived from the shared data.

12. A method for initializing operation for an information security operation for an entity comprising the steps of:
obtaining pre-stored data representing entity identification data;
obtaining pre-stored data representing shared secret data associated with the entity identification data;
generating first data that is a function of the entity identification data,
generating second data that is a function of the shared secret data,
encrypting the first data based on the second data;
communicating in a clear text fashion, the entity identification data and the encrypted first data for evaluation by an initialization authentication unit;
generating a copy of the first data as a function of the prestored data representing the entity identification data;

storing the copy of the first data with the prestored shared secret data as database entries;
extracting from a database entry, the prestored shared secret data based on communicated first data;
generating a copy of the second data as a function of the extracted prestored shared secret data;
providing the copy of the second data for use in comparing pre-stored shared secret data to shared secret data derived from the encrypted first data to obtain the entity identification data; and
using the obtained entity identification data and the shared secret data as initialization registration data to register the entity as a proper user of the information security operation, in response to the step of comparing data derived from pre-stored shared secret data to shared secret data derived from the encrypted data.

13. The method of claim 12 wherein the pre-stored data representing entity identification data includes temporal data.

14. The method of claim 12 wherein the first data and second data are generated using a function from the group consisting of: a one way hash function, SPEKE, a block cipher encryption, a MAC, a public key encryption, or the identity function.

15. The method of claim 12 including the step of:
prior to the step of comparing, decrypting, by the initialization authentication unit, the encrypted first data using the second data based on the database entry.

16. A system for initializing operation for an information security operation for an entity comprising:
memory containing data representing entity identification data and data representing shared data associated with the entity identification data;
a first processing unit, operatively coupled to receive the data representing entity identification data and the shared data, having an encryptor that encrypts data based on the shared data and communicates in a clear text fashion, the entity identification data and the encrypted data;
an initialization authentication unit, operatively coupled to received the communicated entity identification data and the encrypted data and operatively coupled to the memory, that compares prestored shared data to shared data derived from the encrypted data to obtain the entity identification data; and uses the obtained entity identification data and the shared data as initialization registration data to register the entity as a proper user of the information security operation, in response to comparing prestored shared data to shared data derived from the encrypted data.

17. The system of claim 16 wherein the data that is encrypted includes data representing the entity identification data.

18. The system of claim 16 wherein the data that is encrypted includes temporal data.

19. The system of claim 17 wherein the first processor generates first data that is a function of the entity identification data, and encrypts the first data based on the shared data.

20. The system of claim 19 wherein the first processor generates second data that is a function of the shared data, and encrypts the first data based on the second data.

21. The system of claim 19 wherein the first data and second data are generated using a function from the group consisting of: a one way hash function, SPEKE, block cipher encryption, a MAC, public key encryption, or the identity function.

22. The system of claim 20 including a second processor operatively coupled to the memory, that generates first data that is a function of the prestored data representing the entity identification data, stores the first data with the prestored shared data as database entries, extracts from a database entry, the prestored shared data based on the first data, generates second data as a function of the extracted prestored shared data; and provides the second data for use in comparing.

23. The system of claim 16 wherein the shared data is shared secret data.

24. The system of claim 22 wherein the initialization authentication unit includes the second processor.

25. The system of claim 22 wherein the initialization authentication unit, prior to comparing, decrypts the encrypted data using the second data.

26. The system of claim 22 wherein the initialization authentication unit, prior to comparing, encrypts shared data and compares the encrypted shared data with received encrypted data.

27. A storage medium comprising:
   memory containing executable instruction that when read by one or more processing units, causes the one or more processing units to:
      obtain data representing entity identification data;
      obtain data representing shared data associated with the entity identification data;
      encrypt data, based on the shared data;
      communicate in a clear text fashion, the entity identification data and the encrypted data for evaluation by an initialization authentication unit;
      compare prestored shared data to shared data derived from the encrypted data to obtain the entity identification data; and
      use the obtained entity identification data and the shared data as initialization registration data to register the entity as a proper user of the information security operation, in response to comparing prestored shared data to shared data derived from the encrypted data.

28. The storage medium of claim 27 wherein the data that is encrypted includes data representing the entity identification data.

29. The storage medium of claim 27 wherein the data that is encrypted includes temporal data.

30. The storage medium of claim 28 including memory containing executable instruction that when read by the one or more processing units, causes the one or more processing units to generate first data that is a function of the entity identification data, and encrypt the first data based on the shared data.

31. The storage medium of claim 30 including memory containing executable instruction that when read by the one or more processing units, causes the one or more processing units to generate second data that is a function of the shared data, and encrypt the first data based on the second data.

32. The storage medium of claim 31 wherein the first data and second data are generated using a function from the group consisting of: a one way hash function and PAKE.

33. The storage medium of claim 27 including memory containing executable instructions that when read by the one or more processing units, causes the one or more processing units to pre-store the data representing the entity identification data and pre-storing the shared data, prior to obtaining data representing entity identification data.

34. The storage medium of claim 33 including executable instructions that when read by the one or more processing units, causes the one or more processing units to:
   generate first data that is a function of the prestored data representing the entity identification data;
   store the first data with the prestored shared data as database entries;
   extract from a database entry, the prestored shared data based on the first data;
   generate second data as a function of the extracted prestored shared data; and
   provide the second data for use in comparing prestored shared data to shared data derived from the encrypted data to obtain the entity identification data.

35. The storage medium of claim 27 wherein the shared data is shared secret data.

* * * * *